May 24, 1966 K. G. SORENSEN 3,252,420
AUTOMATIC LIQUID LEVEL CONTROL APPARATUS FOR TANKS
Filed Aug. 31, 1964
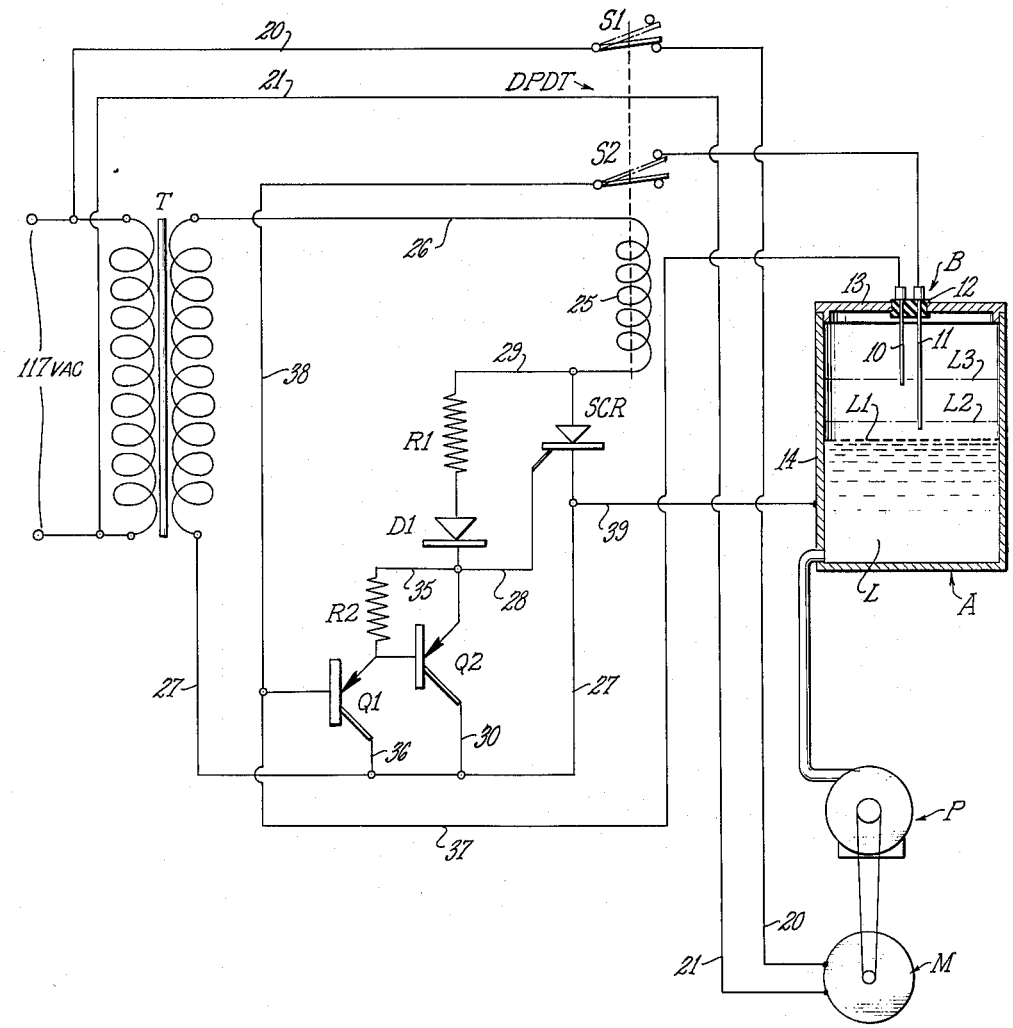
INVENTOR.
KENNETH G. SORENSEN
BY
*Lynn V. Latta*
ATTORNEY United States Patent Office 3,252,420
Patented May 24, 1966

3,252,420
AUTOMATIC LIQUID LEVEL CONTROL
APPARATUS FOR TANKS
Kenneth G. Sorensen, 12118 Ohio Ave.,
West Los Angeles, Calif.
Filed Aug. 31, 1964, Ser. No. 393,196
7 Claims. (Cl. 103—25)

This invention relates to the control of liquid levels in a tank and has as its general object to provide automatic control means for replenishing the supply of liquid in a tank when it has dropped to a selected minimum level and for discontinuing the replenishing operation when it has risen to a selected maximum level.

Toward the attainment of this general object, the invention provides a liquid level control apparatus:

(1) Automatically responsive to the dropping of liquid level to a selected minimum to start the operation of a pump for pumping additional liquid into a tank, adapted to continue the pumping operation as the liquid level rises below said minimum until it reaches a maximum level; and to then turn off the pumping apparatus in response to the arrival of the liquid at the maximum level.

(2) Utilizing a combination of relay, silicon-controlled rectifier for establishing an energizing circuit to the relay, and transistorized biasing circuit for controlling the operation of the rectifier in a manner to achieve the starting of the pump at the minimum level and the termination of the pumping operation at the maximum level, with continued pumping operation between these levels.

(3) Providing pickup control in phase with alternating current power supply so as to effect relay operation (opening of its heavy current-carrying switch) at a low-voltage point of the voltage rise of a cycle of alternation, thereby minimizing arcing, prolonging the life of the relay, and making it possible to use a relatively small relay.

Other objects will become apparent in the ensuing specification and the appended drawing, which is a schematic diagram of a system embodying the invention.

Referring now to the drawing in detail, I have shown therein, as an example of one form in which my invention may be embodied, a liquid storage and pumping system comprising, in general, a reservoir or tank A for containing a body of liquid L; a liquid level sensing electrode assembly B in the top of tank A; a pump P for replenishing the volume of liquid in the tank from a minimum level to a maximum level; a control circuit comprising, in general, a double-pole, double-throw relay DPDT including a switch S1 for establishing an energizing circuit to the motor M; a silicon-controlled rectifier SCR for establishing an energizing circuit to the relay DPDT; a biasing circuit for rectifier SCR comprising a resistor R1, a diode D1 and a transistor Q2; a biasing circuit for transistor Q2 comprising a resistor R2 and a pilot transistor Q1; and a current supply comprising a transformer T energized by a common 110–117 volt supply line designated 117VAC.

A minimum liquid level in tank A as illustrated at L1; an intermediate level at L2; and a maximum level at L3. Electrode assembly B comprises a short electrode 10 and a long electrode 11 mounted in a plug or other support 12 of insulating material in the top 13 of tank A and projecting downwardly through the top 13. Electrode 10 extends downwardly to a point slightly below the maximum level L3. Electrode 11 extends downwardly to a point slightly below the intermediate level L2 and slightly above the minimum level L1.

The body 14 of tank A is of electrically conductive material (e.g. a suitable metal) and the body of liquid L within the tank A is likewise sufficiently conductive to become part of the control circuit.

A direct circuit from a supply line 117VAC for energizing motor M is provided by a pair of motor current leads 20 and 21 connected in parallel across the line 117VAC, and by a power switch S1 of relay DPDT, the switch S1 being interposed in one of the leads (e.g. the lead 20 as shown). When the liquid level is at the minimum L1, power switch S1 closes to complete the connection through current lead 20 for energizing motor M (the condition shown in the drawing). When the liquid level has been reestablished at the maximum L3, switch S1 returns to a normally open position, indicated in phantom.

Relay DPDT embodies an energizing coil 25 which is connected to the secondary of transformer T by conductors 26 and 27 and the rectifier SCR which is interposed in the conductor 27. Current will flow in this energizing circuit when the SCR becomes conducting, and will result in shifting of the relay to its alternate position shown in full lines wherein switch S1 is closed and switch S2 is opened.

Rectifier SCR is biased by the biasing circuit R1, D1, the cathode of diode D1 having a biasing connection to the cathode of rectifier SCR through a conductor 28, and the resistor R1 being connected to the anode of rectifier SCR by a conductor 29. The biasing circuit further includes the emitter-collector circuit of transistor Q2 and a connection 30 between the Q2 collector and the conductor connection 27 to the transformer T.

The biasing circuit for transistor Q2 comprises a resistor R2, the emitter-collector circuit of transistor Q1, a connection 35 to the emitter of transistor Q2, and a connection 36, 27, 30 between the collector of transistor Q1 and the collector of transistor Q2.

Pilot transistor Q1 is base biased by parallel connections through conductors 37 and 38 from its base to electrode 10 and 11 respectively, the conductor 37 providing a direct connection and the conductor 38 having the switch S2 of relay DPDT interposed therein. This biasing circuit is completed by a conductor connection 39 from conductor 27 to the body of tank A.

Rectifier SCR functions as a pilot relay to turn on and off the electromagnetic relay DPDT which cannot follow the 60 cycle alternations of a common 110 volt power current.

When transistor Q1 conducts, it causes transistor Q2 likewise to conduct. When transistor Q1 becomes non-conducting, transistor Q2 likewise becomes non-conducting. When transistor Q2 becomes conducting, recifier SCR is biased to a non-conductive state. This occurs as follows: the shunt circuit through the transistor drops the gate voltage of the SCR to zero. Then, as the voltage of the power current output of transformer T drops to zero at the end of a positive half cycle, and the anode voltage of the SCR thus is dropped to zero, the SCR will be turned off, to deenergize the relay.

The SCR is biased back to the conducting state when transistor Q2 becomes non-conducting.

Controlled pickup (operation of relay DPDT to start motor operation) at low voltage on the power supply sine wave, is provided by the following operational characteristics: the SCR being inherently a uni-directional conductor, can conduct only during the positive half cycle. Likewise, the diode D passing current during only a half cycle of the power wave, maintains transistors Q1 and Q2 non-conducting during the negative half cycle. The biasing circuits of transistors Q1 and Q2 are phase-controlled, i.e., directly responsive to alternations in the voltage output of the secondary of transformer T, but since they can not respond to voltage changes in the negative half cycle, will be come responsive at the beginning of a positive half cycle. Their response being virtually instantaneous, they will bias the transistors to non-conducting state in the early part of the range of voltage increase from zero, approximately one-fourth of the rise from zero to peak voltage and within the first quarter of the voltage rise. The SCR will correspondingly become conductive to energize the relay and close its power switch S1 when the voltage is within the first quarter of its rise. The voltage across the contacts of switch S1 (the power switch) as the contacts close, will therefore never exceed one-fourth of peak voltage. Consequently, arcing will be minimized, relay life will be greatly lengthened, and a much smaller relay can be utilized than would be possible in a conventional circuit having no pickup control. Increase in relay life, other factors being the same, can be as much as 10:1. A one-third horsepower motor, drawing as much as 17 amperes of 110 volt current at peak load (starting) could cause damaging arcing of the switch contacts if load pickup were to occur at peak voltage of the power current.

In the operation of the system, when the liquid level is at L1 minimum, both biasing circuits to the transistor Q1 will be open and consequently both transistors Q1 and Q2 will be nonconducting. Correspondingly, rectifier SCR will conduct current in the relay energizing circuit T, 26, 25, SCR, 27, the relay will shift to its alternate position shown in full lines, and the biasing circuit 38 will be opened at a second point at switch S2 as well as between electrode 11 and liquid body L. At the same time, power switch S1 will be closed, closing the energizing circuit to motor M and starting the operation of pump P which will then proceed to pump liquid into the tank A. When the liquid level reaches L2, the biasing circuit 38 will remain open at switch S2 and no change in operation will take place. When the liquid level reaches L3, however, the biasing circuit 37 will be closed by contact of liquid body L with electrode 10, the transistor Q1 will be biased to a conducting condition thereby biasing transistor Q2 to a like conducting condition, and the rectifier SCR will thereby be reversed to a nonconducting state. This will open the energizing circuit of relay DPDT, causing the relay to revert by spring-loading to its normal condition indicated in dotted lines, in which power switch S1 is opened to terminate the operation of motor M and switch S2 is closed to complete the biasing circuit 38 through electrode 11 and liquid body L. This terminates the stage of replenishing operation, and the apparatus will then remain inactive as the liquid level drops back toward its minimum level L1. As the level drops below the lower end of electrode 10, opening the biasing circuit 37, the biasing circuit 38 will remain closed through switch S2 and consequently the transistors Q1 and Q2 will be maintained in their conducting condition and the rectifier SCR will be correspondingly maintained in its nonconducting condition, the switch S1 will remain open, and the pump P will remain inoperative. The circuit through switch S2 therefore functions as a holding circuit to maintain the motor circuit inoperative until the liquid level drops to the minimum L1, whereupon the biasing circuit 38 will be opened between electrode 11 and liquid L, thereby causing the transistors Q1 and Q2 to return to their nonconductive state and the rectifier SCR to correspondingly revert to its conducting state. Thereupon the energizing circuit to the relay DPDT is reestablished, again starting the operation of pump P and completing a full cycle of operation of the apparatus.

An important object and advantage attained by the invention is high sensitivity of response, requiring only one-half volt potential across the liquid-level sensing, transistor-biasing circuit. Correspondingly, the current through the liquid can be quite low—as low as 10 microamperes (.00001 amp.). Such low voltage and current intensities will completely eliminate any possibility of sparking between electrode and liquid surfaces, thereby fully avoiding the hazard of possible ignition of vapor where a volatile liquid is stored in the tank. Also, it will avoid all possibility of electric shock to a person touching the tank and electrode simultaneously; and will avoid electrolytic decomposition of the liquid in the tank.

It is estimated that the amplification gain in the circuit may be as high as 100,000:1, making possible the extremely low sensing current.

I claim:

1. Automatic liquid level control apparatus for liquid tanks comprising, in comibnation: a tank adapted to hold a body of liquid therein at a volume between respective minimum and maximum levels; a pump and an electric motor to drive it, for replenishing said volume when depleted; a relay including a normally open switch; a power circuit for said motor including said normally open switch operative, when the relay is energized, to close said circuit to effect operation of said pump; and energizing circuit for said relay including a silicon-controlled rectifier as one of the connections therein; a biasing circuit for said rectifier including a transistor adapted, when conducting, to render said rectifier nonconducting so as to deenergize said relay, and vice versa; a biasing circuit for said transistor including a connection to the body of liquid in said tank below its minimum level and an elecrode supported in the upper region of said tank and depending for contact with said body of liquid to establish said transistor-biasing circuit so as to maintain said relay deenergized; the lower end of said electrode being positioned to break said contact at the minimum liquid level to open said transistor biasing circuit so as to render said transistor nonconducting and said rectifier conducting, thereby energizing said relay, reversing said normally open switch to its closed position and thereby closing the circuit to said pump motor to commence said replenishing operation.

2. Control apparatus as defined in claim 1, further including a second electrode in the upper region of said tank, depending for contact with said liquid body, with its lower end positioned to make said contact at the maximum level, to establish said transistor biasing circuit independently of said normally-closed switch and to thereby deenergize said relay to terminate a stage of pumping operation when said volume has been replenished to said maximum level.

3. Control apparatus as defined in claim 1, wherein said transistor-biasing circuit is directly responsive to voltage changes in said power circuit and includes a diode maintaining said transistor non-conductive during the negative half cycle of current in said power circuit, whereby said transistor will trigger the operation of said relay to close said normally open switch during the first quarter of voltage rise from zero to peak voltage in said power circuit, thereby minimizing arcing across the contacts of said normally-open switch.

4. Control apparatus as defined in claim 1, including a pilot transistor that is phase-responsive to voltage changes in said power circuit for controlling relay pickup to close said normally open switch within the first quarter of voltage rise in a positive half cycle of the power current, for pickup of the starting load of said pump.

5. Automatic liquid level control apparatus for liquid tanks comprising, in combination: a tank adapted to hold a body of liquid therein at a volume between respective minimum and maximum levels; a pump and an electric motor to drive it, for replenishing said volume when depleted; relatively short and long electrodes supported in the upper region of the tank and projecting downwardly to approximately the maximum and minimum levels respectively; a double-pole, double-throw relay including a normally open switch and a normally closed switch; a power circuit for said motor including said normally open switch operative, when the relay is energized, to close said circuit to effect operation of said pump; and energizing circuit for said relay including a silicon controlled rectifier as one of the connections therein; a biasing circuit for said rectifier; means including a transistor adapted, when conducting to render said rectifier nonconducting so as to deenergize said relay, and vice versa; a biasing circuit for said transistor; means including said long electrode, the normally closed switch of said relay, and a connection to the body of liquid in said tank below its minimum level, to open said transistor-biasing circuit so as to energize said relay and start said pump when liquid level drops to said minimum; and means including said short electrode, providing an alternate biasing circuit for said transistor, shunted across said normally-closed switch, for rendering said rectifier non-conducting so as to determine the operation of said pump when liquid level reaches said maximum.

6. Control apparatus as defined in claim 5, including a pilot transistor, responsive to a first-quarter stage of voltage rise in a positive half cycle of alternation in said power circuit, for rendering said first-mentioned transistor non-conductive, thereby rendering said rectifier conductive, to energize said relay, thereby closing said normally-open switch for starting pump operation.

7. Automatic liquid level control apparatus for liquid tanks comprising, in combination: a tank adapted to hold a body of liquid therein at a volume between respective minimum and maximum levels; a pump and an electric motor to dive it, for replenishing said volume when depleted; a double-pole, double-throw relay including a normally open switch and a normally closed switch; a power circuit for said motor including said normally open switch operative, when the relay is energized, to close said circuit to effect operation of said pump; an energizing circuit for said relay including a silicon-controlled rectifier as one of the connections therein; a biasing circuit for said rectifier including a transistor adapted, when conducting, to render said rectifier non-conducting so as to deenergize said relay, and vice versa; a biasing circuit for said transistor; and means including the normally closed switch of said relay, a connection to the body of liquid in said tank below its minimum level, and an electrode supported in the upper region of said tank and depending for contact with said body of liquid to establish said transistor-biasing circuit so as to render said transistor conducting and said rectifier non-conducting thereby deenergizing said relay and opening said switch to terminate a stage of pumping operation, said transistor being phase-responsive to current in said power circuit so as to open said switch during a first-quarter stage of voltage rise in said current, thereby minimizing arcing in said switch.

References Cited by the Examiner
UNITED STATES PATENTS 2,863,472 12/1958 Coles et al. _____ 137—394 X
3,118,391 1/1964 Ciabattari _____ 103—25 X
3,131,335 4/1964 Berglund _____ 317—148.5
3,180,038 4/1965 Chafee _____ 317—123.4 X SAMUEL LEVINE, *Primary Examiner*.